US009100168B2

(12) United States Patent
Itoh

(10) Patent No.: US 9,100,168 B2
(45) Date of Patent: Aug. 4, 2015

(54) SERIAL COMMUNICATION CIRCUIT, SEMICONDUCTOR DEVICE, AND SERIAL COMMUNICATION CONTROLLING METHOD

(75) Inventor: Takuya Itoh, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 608 days.

(21) Appl. No.: 13/367,848

(22) Filed: Feb. 7, 2012

(65) Prior Publication Data

US 2012/0201313 A1   Aug. 9, 2012

(30) Foreign Application Priority Data

Feb. 7, 2011   (JP) ................................. 2011-024208

(51) Int. Cl.
*G06F 13/28* (2006.01)
*G06F 3/00* (2006.01)
*G06F 5/00* (2006.01)
(Continued)

(52) U.S. Cl.
CPC .............. *H04L 7/042* (2013.01); *H04L 1/0002* (2013.01); *H04L 1/0015* (2013.01); *H04L 7/08* (2013.01)

(58) Field of Classification Search
CPC ..... G06F 13/385; G06F 5/06; H04L 25/0262; H04L 1/0002
USPC .......... 710/60, 25, 29, 58; 375/225, 340, 343, 375/369, 232, 376; 713/501
See application file for complete search history.

(56) References Cited

U.S. PATENT DOCUMENTS 4,926,447 A * 5/1990 Corsetto et al. ................ 375/376
6,158,014 A * 12/2000 Henson .......................... 713/501
(Continued)

FOREIGN PATENT DOCUMENTS

JP          8331118      6/1998
JP       2002-531888      9/2002
(Continued)

OTHER PUBLICATIONS

Working Draft American National Standard, T13 Project 1532D vol. 3; Information Technology-AT Attachment with Packet Interface—7 vol. 3—Serial Transport Protocols and Physical Interconnect (ATA/ATAPI-7 V3) (Revision4b, Apr. 21, 2004.
(Continued)

*Primary Examiner* — Farley Abad
*Assistant Examiner* — Henry Yu
(74) *Attorney, Agent, or Firm* — Young & Thompson

(57) ABSTRACT

In a serial communication circuit, a data extracting section extracts reception data based on a reception clock signal with maximum speed. A pattern determining section compares a reception bit pattern of the reception data corresponding to a characteristic pattern and each of a plurality of detection bit patterns for the characteristic pattern, and indicates when the reception bit pattern matches one of the detection bit patterns. A periodicity determining section determines a period when the reception bit pattern matches the detection bit pattern, based on the pattern match indication, detects that the detection bit pattern emerges continuously in a stream of the reception data every the period, and determines a generation difference between transmission and reception speeds based on the detection bit pattern. A transmission rate setting section determines the transmission speed of a connected device transmitting the reception data based on the generation difference and maximum speed.

20 Claims, 7 Drawing Sheets

(51) Int. Cl.
*H04B 3/46* (2006.01)
*H03H 7/30* (2006.01)
*G06F 1/00* (2006.01)
*H04L 7/04* (2006.01)
*H04L 1/00* (2006.01)
*H04L 7/08* (2006.01)

(56) References Cited

U.S. PATENT DOCUMENTS

| | | | |
|---|---|---|---|
| 6,658,363 B2 * | 12/2003 | Mejia et al. | 702/125 |
| 6,798,869 B1 * | 9/2004 | Sidhu et al. | 379/93.33 |
| 6,944,248 B2 * | 9/2005 | Sullivan | 375/369 |
| 8,312,192 B2 | 11/2012 | Tsubota | |
| 8,374,321 B2 * | 2/2013 | Sidhu et al. | 379/93.08 |
| 8,599,973 B2 * | 12/2013 | Galbraith et al. | 375/343 |
| 2004/0042544 A1 * | 3/2004 | Mejia | 375/225 |
| 2007/0192469 A1 * | 8/2007 | Gentieu et al. | 709/223 |
| 2008/0183923 A1 * | 7/2008 | Forster | 710/60 |
| 2009/0296859 A1 * | 12/2009 | Faulhaber et al. | 375/340 |
| 2010/0124264 A1 * | 5/2010 | Hamidi et al. | 375/225 |
| 2010/0246657 A1 * | 9/2010 | Ou | 375/232 |

FOREIGN PATENT DOCUMENTS

| | | |
|---|---|---|
| JP | 2008-236178 | 10/2008 |
| JP | 201115180 | 1/2011 |

OTHER PUBLICATIONS

Japanese Office Action dated Jul. 8, 2014, corresponding to JP Application No. 2011-024208.

* cited by examiner

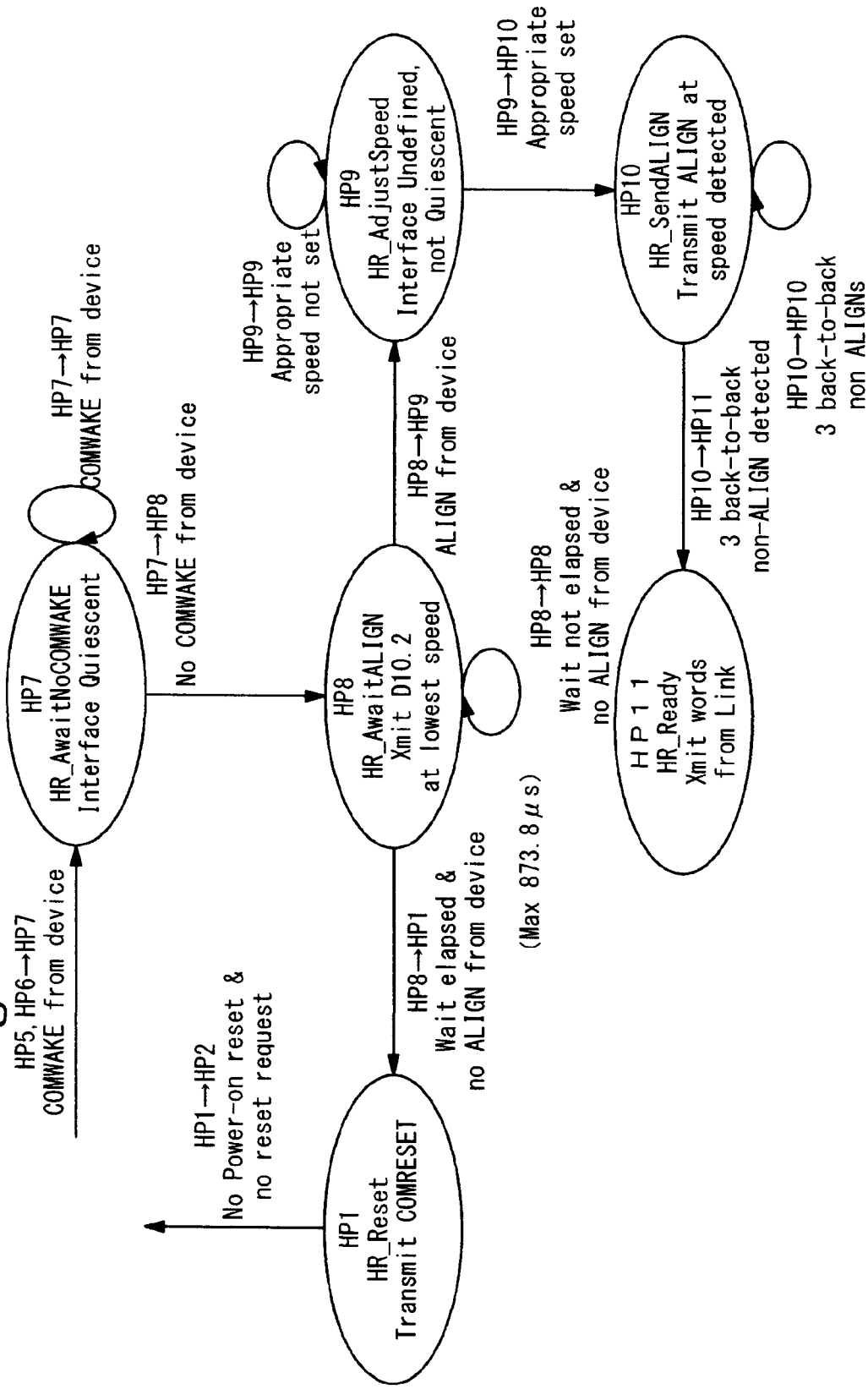

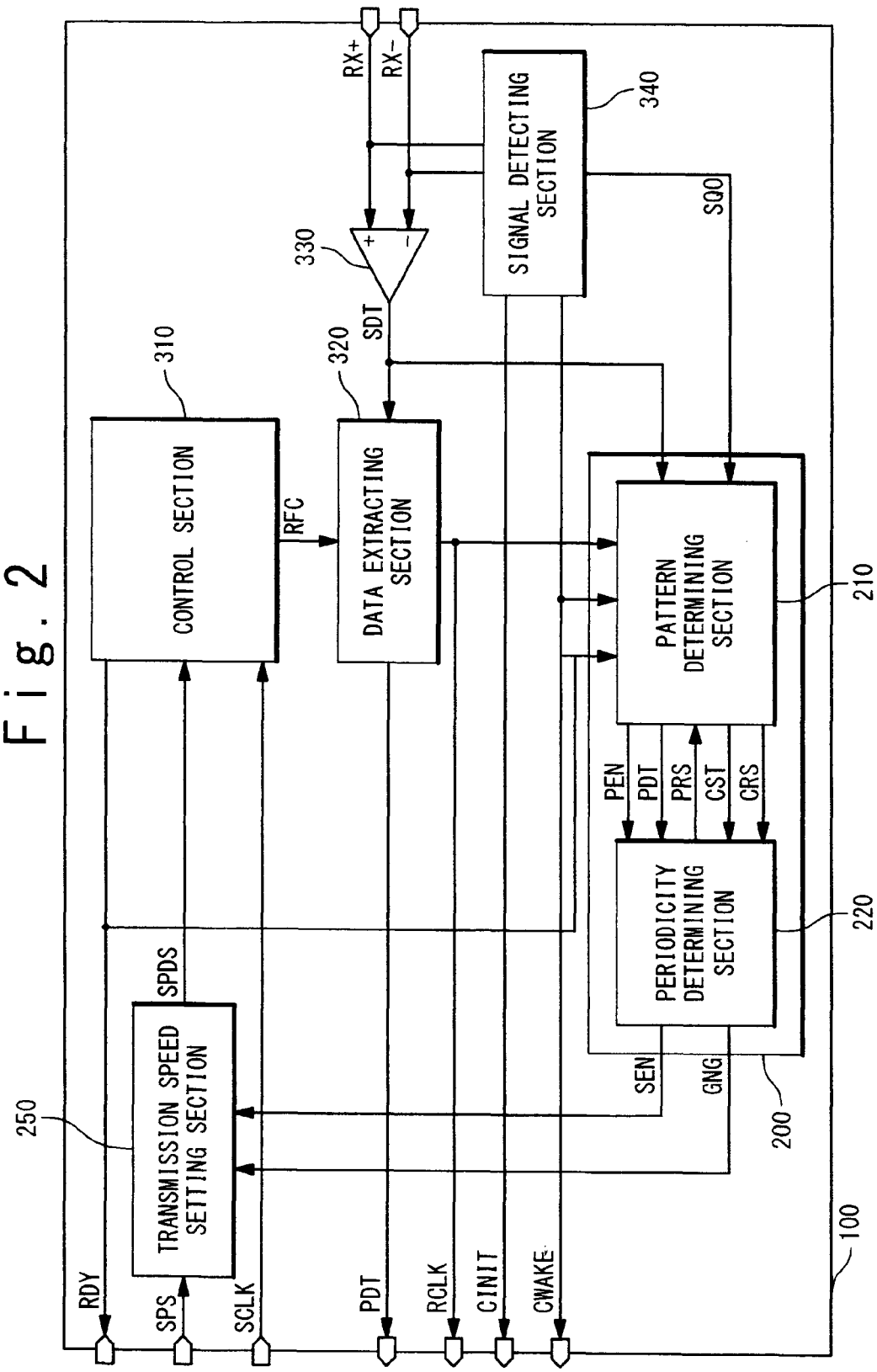

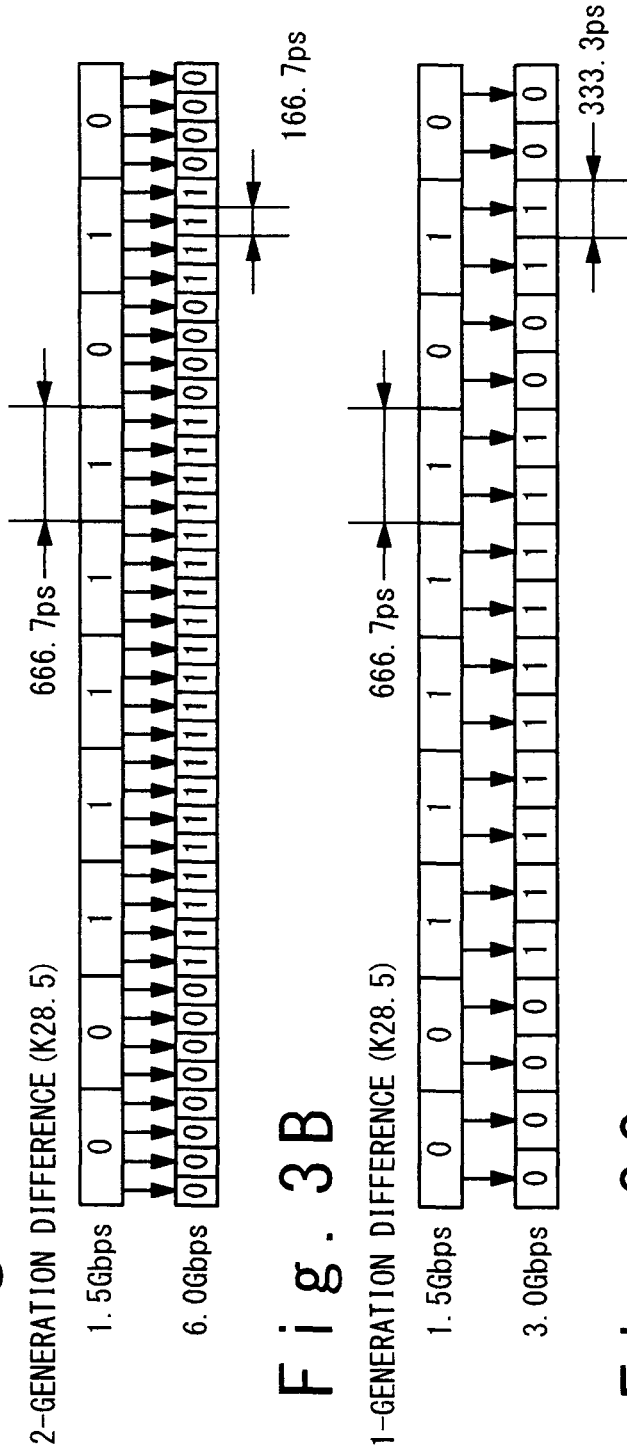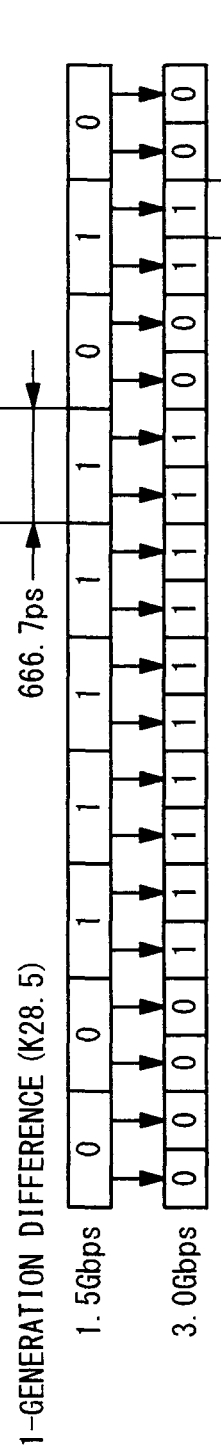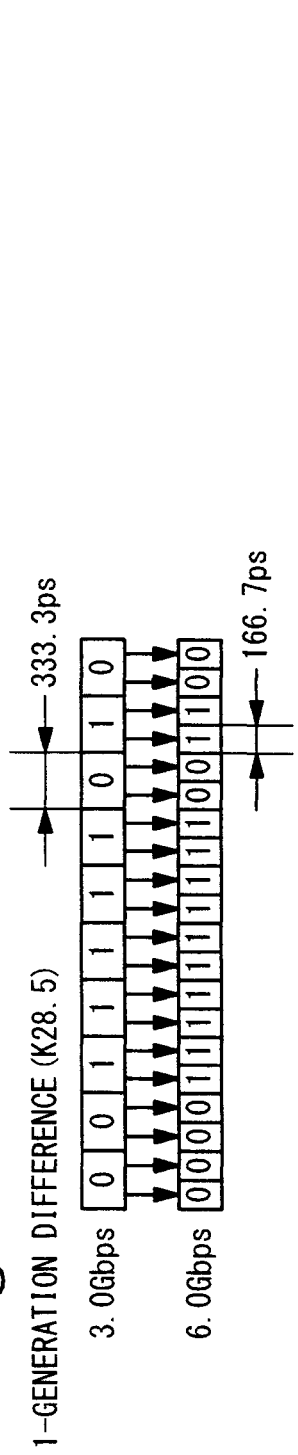

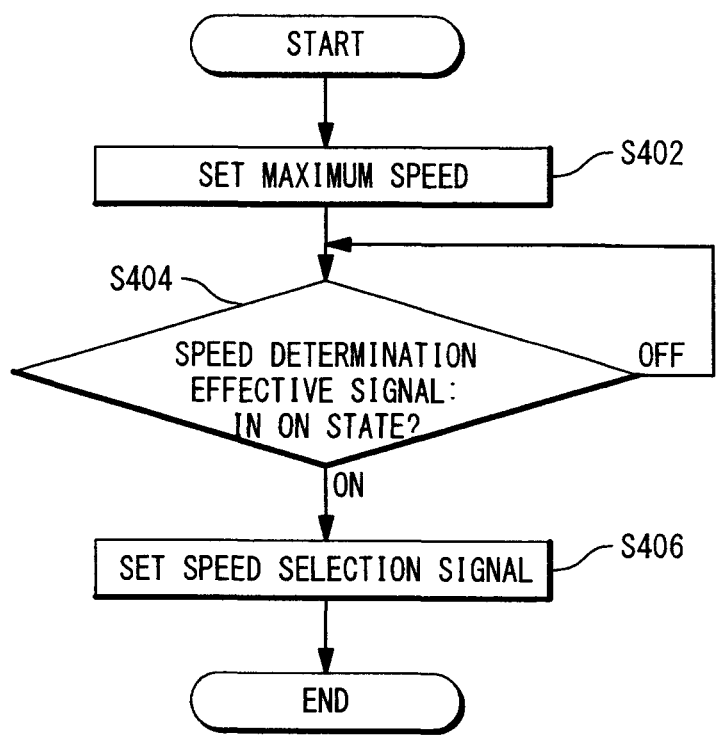

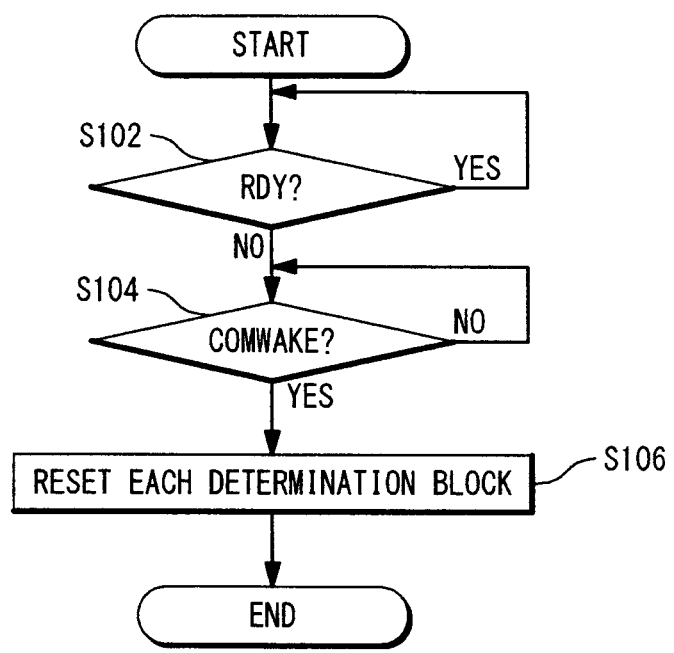

SERIAL COMMUNICATION CIRCUIT, SEMICONDUCTOR DEVICE, AND SERIAL COMMUNICATION CONTROLLING METHOD

CROSS REFERENCE

This patent applications claims a priority based on Japanese Patent Application No. JP 2011-24208. The disclosure thereof is incorporated herein by reference.

TECHNICAL FIELD

The present invention is related to a high-speed serial communication circuit, a semiconductor device, and a serial communication controlling method, and for example, the present invention is related to setting of transmission speed in a serial communication circuit and a semiconductor device mounted with the serial communication circuit.

BACKGROUND ART

In recent years, a semiconductor device with a high-speed serial interface is increasing. In the semiconductor device with an interface based on the serial ATA (Advanced Technology Attachment) standard, as one of the high-speed serial interfaces, as a large amount of communication data is required for transmission of video data of high quality and high definition, the further increasing of the transmission speed is required. Therefore, as shown in Non-Patent Literature 1, in the serial ATA standard, the increasing of the transmission speed has been carried forward as 1.5 Gbps in generation 1 (a first generation or Gen1), 3.0 Gbps in generation 2 (a second generation or Gen2), and 6.0 Gbps in generation (a third generation or Gen3).

In this way, in the serial ATA standard, a standard of high transmission speed has been added through revision of the standard. Therefore, there are a plurality of connection speed modes, and one of the connection speed modes must be determined between a host unit and a device unit connected with the host unit. That is, it is necessary to determine the connection speed mode for data transmission and reception before the start of communication. For example, when the host unit such as a personal computer and the device unit such as a hard disk drive (HDD) are connected by a serial ATA interface, it is not possible to communicate if not determining the transmission speed. The transmission speed for the data transmission and reception between both of the units is determined at the time of start of communication by a procedure called a speed negotiation.

Also, it is expected that the increasing of the transmission speed moves ahead in the new generation in the future. As the generation difference between the host unit and the device unit becomes large, the number of times of the speed negotiation increases.

A serial data receiving circuit which determines the transmission speed in such a manner is disclosed in Patent Literature 1 (JP 2008-236178A). This serial data receiving circuit determines the transmission speed of a signal by determining whether or not the number of signal change points between two pulses generated by a period pulse generating section is within a predetermined number.

FIG. 1 is a state transition diagram showing an initialization operation at the time of start of communication in the serial ATA interface of the host unit. However, only the state HP1 and the states HP7-HP11 are shown in the Non-Patent Literature 1 which is related to the present invention.

Although not shown, an GOB sequence is first executed at the time of the start of communication, and when the host unit receives COMWAKE from the device unit, the state transfers to the state HP7. In the state HP7, the host unit waits for the end of COMWAKE transmitted from the device unit. When the device unit stops the transmission of COMWAKE, the state transfers to the state HP8 so as to start the speed negotiation.

In the state HP8, the host unit receives an ALIGN primitive transmitted from the device unit in the maximum speed while transmitting D10.2 code to the device unit in the minimum speed (1.5 Gbps), and determines the transmission speed of data which is transmitted from the device unit. When the speeds coincide with each other so that the ALIGN primitive can be detected, the host unit transfers to the state HP9 to set the transmission speed and then transfers to the state HP10. The host unit replies the ALIGN primitive to the device unit in the same transmission speed as the device unit uses, and completes the speed negotiation. Moreover, when a primitive except for ALIGN is transmitted from the device unit and the host unit receives it, the host unit transfers to the state HP11 and completes the connection establishment.

On the other hand, when the host unit cannot detect the ALIGN primitive during the longest period of 873.8·s in the state HP8 because of the reception speed of the host unit is faster than the transmission speed of the device unit, the host unit lowers the reception speed for 1-generation and returns to the state HP1 to carry out the initialization operation from the beginning.

The host unit performs the OOB sequence, and repeats until the ALIGN primitive can be detected.

In this way, the host unit repeats connection trial until the connection can be established, while it changes the operation speed mode from the latest generation to the oldest generation and waits for the time-out. Therefore, even if the host unit is newer than the generation of the connected device, it is not possible to detect the connection speed mode immediately. Therefore, sometimes it takes a long time until the connection establishment.

CITATION LIST

[Patent Literature 1]: JP 2008-236178A

[Non-Patent Literature 1]: "Information Technology-AT Attachment with Packet Interface—7 Volume 3—Serial Transport Protocols and Physical Interconnect (ATA/ATAPI-7 V3)" (Revision4b, 21 Apr. 2004)

SUMMARY OF THE INVENTION

The present invention provides a technique for reducing a time to the transmission speed determination.

In a serial communication circuit, a data extracting section extracts reception data based on a reception clock signal with a maximum speed. A pattern determining section compares a reception bit pattern of the reception data corresponding to a characteristic pattern and each of a plurality of detection bit patterns for the characteristic pattern, and notifies a notice of pattern matching when the reception bit pattern matches one of the plurality of detection bit patterns. A periodicity determining section determines a period when the reception bit pattern matches the detection bit pattern, in response to the notice from the pattern determining section, detects that the reception bit pattern emerges in a stream of the reception data every the period, and determines a generation difference between a transmission speed and a reception speed based on the detection bit pattern. A transmission rate setting section determines the transmission speed of a connected device which transmits the reception data based on the generation difference and the maximum speed.

A semiconductor device contains a serial communication circuit which is provided with a data extracting section configured to extract reception data based on a reception clock signal with a maximum speed; a pattern determining section configured to compare a reception bit pattern of the reception data corresponding to a characteristic pattern and each of a plurality of detection bit patterns for the characteristic pattern, and notify a notice of pattern matching when the reception bit pattern matches one of the plurality of detection bit patterns; a periodicity determining section configured to determine a period when the reception bit pattern matches the detection bit pattern, in response to the notice from the pattern determining section, detect that the reception bit pattern emerges in a stream of the reception data every the period, and determine a generation difference between a transmission speed and a reception speed based on the detection bit pattern; and a transmission rate setting section configured to determine the transmission speed of a connected device which transmits the reception data based on the generation difference and the maximum speed.

A serial communication control method is achieved by extracting reception data based on a reception clock signal with a maximum speed; by comparing a reception bit pattern of the reception data corresponding to a characteristic pattern and each of a plurality of detection bit patterns for the characteristic pattern to notify a notice of pattern matching when the reception bit pattern matches one of the plurality of detection bit patterns; by determining a period when the reception bit pattern matches the detection bit pattern, in response to the notice from the pattern determining section; by detecting that the reception bit pattern emerges in a stream of the reception data every the period; by determining a generation difference between a transmission speed and a reception speed based on the detection bit pattern; and by determining the transmission speed of a connected device which transmits the reception data based on the generation difference and the maximum speed.

According to the present invention, the serial communication circuit which can reduce the time to the transmission speed determination in the speed negotiation with a connected device, the method of controlling serial communication and the semiconductor device can be provided.

BRIEF DESCRIPTION OF THE DRAWINGS

FIG. 1 is a state transition diagram showing an outline of conventional initialization by a host unit at the time of start of communication in serial ATA;

FIG. 2 is a block diagram showing a configuration of a receiving section of a serial communication circuit in a first embodiment;

FIG. 3A to 3C are diagrams showing a relation of a bit pattern of reception data and a generation difference;

FIG. 4C is a flow chart showing an operation of a transmission rate setting section of the host unit at the time of the speed negotiation in the first embodiment; and FIG. 4D is a flow chart showing an initial setting operation of the host unit at the time of the speed negotiation in the first embodiment.

DESCRIPTION OF EMBODIMENTS

Figure 4A:
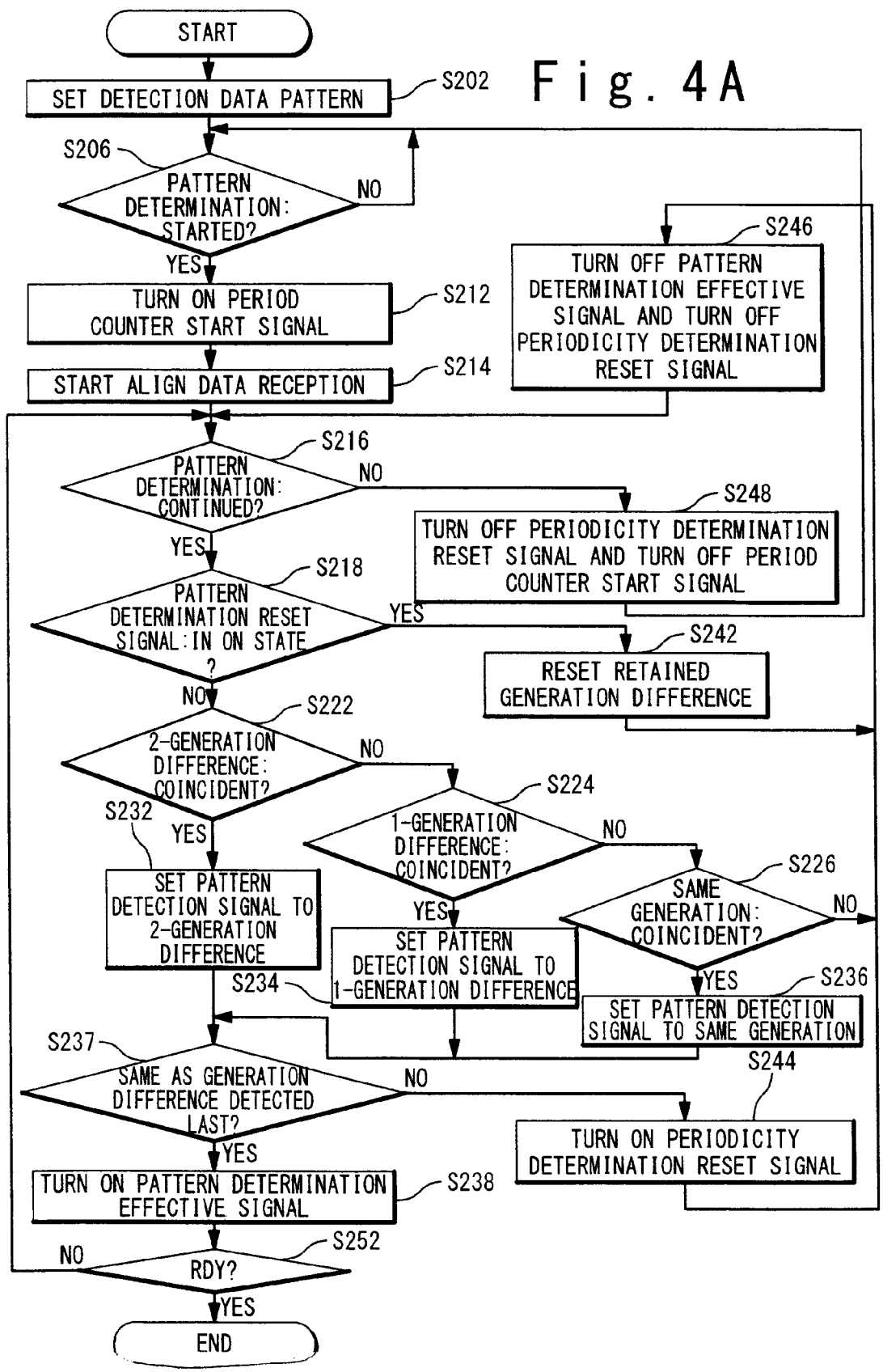
FIG. 4A is a flow chart showing an operation of a pattern determining section of the host unit at the time of speed negotiation in the first embodiment.

Hereinafter, a serial communication apparatus in embodiments will be described with reference to the attached drawings.

First Embodiment

FIG. 2 is a block diagram showing a configuration of a receiving section of the serial communication apparatus in a first embodiment. A receiving section 100 of the serial communication apparatus is provided with a control section 310, a data extracting section 320, a receiver 330, a signal detecting section 340, a determining section 200, and a transmission rate setting section 250. The determining section 200 is provided with a pattern determining section 210 and a periodicity determining section 220. The receiving section 100 will be described as the receiving section of a host unit.

The receiver 330 inputs and quantizes a differential input signal RX± and outputs a serial data signal SDT to the data extracting section 320 and the pattern determining section 210. The data extracting section 320 separates and extracts a clock signal and data from the serial data signal SDT, and outputs a parallel data signal PDT and a reception recovery clock signal RCLK through serial/parallel conversion. The reception recovery clock signal RCLK is supplied to the pattern determining section 210. The signal detecting section 340 detects an OOB (Out Of Band) signal from the differential input signal RX±, and outputs a COMINIT detection signal CINIT, a COMWAKE detection signal CWAKE, and a squelch output signal SQO. The COMWAKE detection signal CWAKE is supplied to the pattern determining section 210. Also, the signal detecting section 340 outputs the squelch output signal SQO to the pattern determining section 210 to show whether or not a signal exceeding a threshold limit value is contained in the differential input signal RX±.

The control section 310 supplies a reference reception clock signal RFC to the data extracting section 320 based on a system clock signal SCLK and a speed mode setting signal SPDS outputted from the transmission rate setting section 250. Also, the control section 310 outputs a communication establishment signal RDY to the pattern determining section 210 to notify that a speed negotiation with a connected device is concluded to allow communication.

The determining section 200 determines whether or not a pattern of an ALIGN primitive which is used for the speed negotiation continues during a predetermined period, and supplies a speed determination effective signal SEN and a generation difference determination signal GNG to the transmission rate setting section 250. That is, when the squelch signal SQO supplied from the signal detecting section 340 shows a signal reception, the pattern determining section 210 outputs a period counter start signal CST to the periodicity determining section 220, monitors emergence of a predetermined pattern of the ALIGN primitive based on the serial data signal SDT, and outputs a pattern effective signal PEN and a pattern detection signal PDT to the periodicity determining section 220 when detecting the predetermined pattern of the ALIGN primitive to determine that a current generation difference is same as the last generation difference. Also, when detecting the predetermined pattern of the ALIGN primitive to determine that the current generation difference is different from the last generation difference, the pattern determining section 210 outputs a periodicity determination reset signal CRS to the periodicity determining section 220.

The periodicity determining section 220 starts a period counting in response to the period counter start signal CST supplied from the pattern determining section 210, and monitors whether or not the predetermined pattern of the ALIGN primitive is detected periodically more than a predetermined number of times, and outputs the speed determination effective signal SEN and the generation difference determination signal GNG to the transmission rate setting section 250. When the detection period of the predetermined pattern of the ALIGN primitive do not coincide with a predetermined period, the periodicity determining section 220 outputs a pattern determination reset signal PRS to the pattern determining section 210.

In the present embodiment, an example of the serial data signal SDT is shown, but it is possible to apply the embodiment to the parallel data signal PDT in the same way.

The transmission rate setting section 250 sets an initial value of the transmission speed based on the speed set signal SPS which is supplied from a LINK layer (not shown). Also, the transmission rate setting section 250 determines an appropriate transmission speed based on the speed determination effective signal SEN and the generation difference determination signal GNG which are outputted from the determining section 200. The transmission rate setting section 250 notifies the transmission speed to the control section 310 by the speed mode setting signal SPDS.

A transmission speed determining method of the determining section 200 will be described. In the SATA (Serial Advanced Technology Attachment) standard, the transmission speed is determined to be the transmission speed of 1.5 Gbps in case of the first generation (Gen1), 3.0 Gbps in case of the second generation (Gen2), and 6.0 Gbps in case of the third generation (Gen3). It is desirable to communicate in the fastest transmission speed which can be supported between the host unit and the device unit, and the adjustment of the transmission speed is carried out before the communication. This adjustment is called a speed negotiation.

Between the host unit and the device unit, first, a procedure of confirming a connection is performed based on the GOB (Out Of Band) signal. The GOB signal shows one of COMRESET, COMINIT, and COMWAKE based on a time in a burst state that the differential signal executes any operation in the transmission speed of 1.5 Gbps and a time in an idle state that the differential signal has a same voltage not to execute any operation. The procedure based on the OOB signal is as follows:
(1) COMRESET is sent from the host unit to the device unit. Here, when COMINIT is earlier sent from the device unit, COMRESET is omitted.
(2) When detecting COMRESET by the device unit, COMINIT is sent from the device unit to the host unit.
(3) When the host unit detects COMINIT, COMWAKE is sent from the host unit to the device unit.
(4) When the device unit detects COMWAKE which is sent from the host unit, COMWAKE is sent from the device unit to the host unit.
(5) After transmitting COMWAKE from the device unit, the speed negotiation is started.

A pattern of a bit string called ALIGN primitive is used for the speed negotiation.

The ALIGN primitive is one kind of control code (primitive) defined for the transmission control, and is shown by four code symbol strings of K28.5 code in 8b/10b conversion and the subsequent D10.2, D10.2, and D27.3. A bit pattern is defined according to a value (+ or −) of running disparity (RD) for each of them. When the bit strings are shown by using the codes in case of beginning with RD− is as an example:
K28.5RD−: 0011111010
D10.2RD+: 0101010101
D27.3RD+: 0010011100.

Therefore, the ALIGN primitive when beginning with RD− is shown as a 40-bit bit string of "0011111010010101010101010101010010011100". This 40-bit bit string is transmitted from a transmission side to a reception side on a transmission path. That is, the serial data signal SDT which is outputted from the receiver 330 can be observed as such a bit string if the transmission speeds are coincident with each other.

When the host unit on the reception side supports Gen2 and the device unit on the transmission side supports Gen1 as an example, the host unit on the reception side receives in Gen2 (3.0 Gbps), the ALIGN primitive transmitted from the device unit on the transmission side in Gen1 (1.5 Gbps). That is, the host unit on the reception side samples the received ALIGN primitive with twice of frequency of the clock signal. In this case, as shown in FIG. 3B, each bit is detected two times. Therefore, a bit pattern of the ALIGN primitive is received as a 80-bit pattern. That is, if the generation difference is one, the frequency of the transmission clock signal is 2 times or ½ times and the time for 1 bit becomes ½ or 2 times (FIG. 3B and FIG. 3C). If the generation difference is two, the frequency of the transmission clock signal is in a relation of $2^2$ or $2^{-2}$ (FIG. 3A). In the same generation difference, the same pattern is detected even if the transmission speed is different (FIG. 3B and FIG. 3C). Therefore, if the bit patterns of two times, four times, . . . of the bit string of the ALIGN primitive are retained, the bit pattern of the received data is compare with the retained bit patterns, and the generation difference can be determined based on a matching pattern. The host unit on the reception side can determine the transmission speed of the ALIGN primitive transmitted from the device unit on the transmission side based on the reception speed of the host unit and the determined generation difference, and sets the reception speed to the transmission speed of the device unit. Thus, the speed negotiation is concluded.

The operation of the speed negotiation of the serial communication apparatus according to the first embodiment will be described with reference to FIG. 4A, FIG. 4B, FIG. 4C, and FIG. 4D.

Figure 4B:
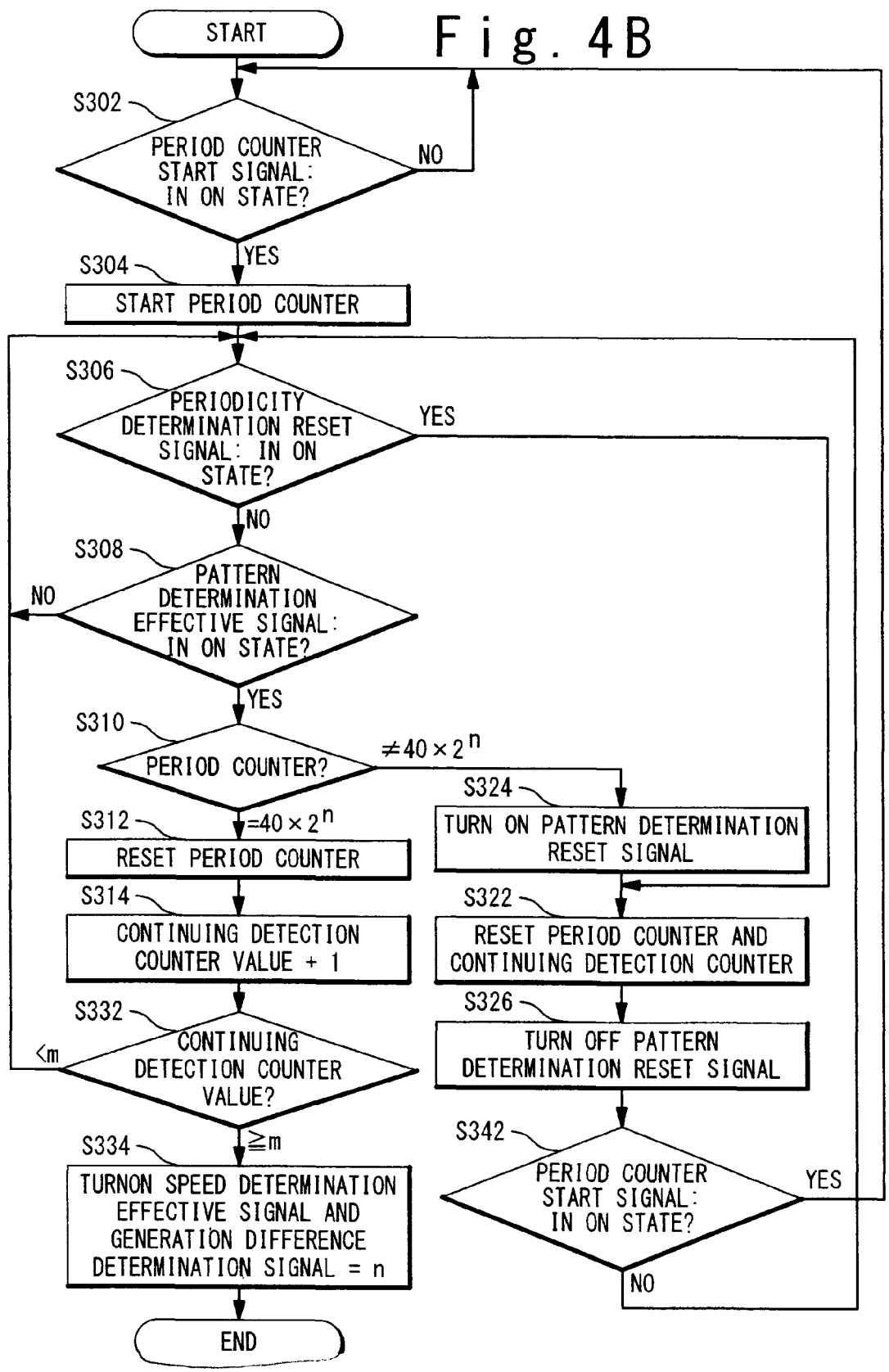
FIG. 4B is a flow chart showing an operation of a periodicity determining section of the host unit at the time of the speed negotiation in the first embodiment.

FIG. 4A is a flow chart showing an operation of the pattern determining section 210 at the time of the speed negotiation of the host unit. FIG. 4B is a flow chart showing an operation of the periodicity determining section 220 at the time of the speed negotiation of the host unit. FIG. 4C is a flow chart showing an operation of the transmission rate setting section 250 at the time of the speed negotiation of the host unit. FIG. 4D is a flow chart showing an operation of the determining section 200 at the time of start. Here, the following description will be given, supporting that the host unit is of the third generation (Gen3) and the device unit is of the first generation (Gen1).

The pattern determining section 210 confirms the communication establishment signal RDY and determines whether or not the speed negotiation should be started (Step S102 in FIG. 4D). The communication establishment signal RDY in the active state shows that a connection between the host unit and the device unit has been established, and the communication establishment signal RDY in an inactive state shows that the connection has not been established, i.e. a speed negotiation is necessary. Therefore, if the communication establishment signal RDY is in the active state (step S102: Yes), the host unit waits until the speed negotiation becomes necessary with no processing. If the communication establishment signal RDY is in the inactive state (step S102: No), the host unit starts the speed negotiation.

The pattern determining section 210 determines whether or not the COMWAKE detection signal CWAKE showing that the response of COMWAKE is detected from the GOB signal outputted from the device unit is in the active state, (Step S104). The host unit waits until detecting COMWAKE from the device unit (Step S104: No). When detecting COMWAKE (step S104: Yes), the determining section 200 starts an initial setting.

As the initial setting, the pattern determining section 210 resets a period counter used to detect the periodicity of data pattern detections and a continuation detection counter used to detect a continuity, which counters are contained in the periodicity determining section 220, and a flag used to determine the bit pattern which is contained in the pattern determining section 210, and so on (Step S106).

Also, the transmission rate setting section 250 instructs the maximum speed which it is possible to set as the transmission speed to the control section 310 by a speed mode setting signal SPDS (Step S402 in FIG. 4C). Here, 6.0 Gbps which is speed of the third generation is set. The control section 310 generates a clock signal of the set speed based on the system clock signal SCLK and supplies it to the data extracting section 320 as a reception reference clock signal RFC.

The pattern determining section 210 sets detection data patterns to be compared with a bit pattern extracted from the reception signal (Step S202 in FIG. 4A). That is, the pattern determining section 210 sets model patterns (the detection data pattern) used to detect the bit pattern of the ALIGN primitive transmitted from the device unit in relate to the generation differences. In the present embodiment, the third generation is a reference, the second generation pattern (1-generation difference) is stretched two times, and a first generation pattern (2-generation difference) is stretched four times. Here, the bit pattern of the ALIGN primitive which begins with RD− are shown.

Original pattern (no generation difference: the third generation)/40 bits:
K28.5: 0011111010
D10.2: 0101010101
D10.2: 0101010101
D27.3: 0010011100
1-generation difference pattern (the second generation)/80 bits:
K28.5: 00001111111111001100
D10.2: 00110011001100110011
D10.2: 00110011001100110011
D27.3: 00001100001111110000
2-generation difference pattern (the first generation)/160 bits:
K28.5: 00000000111111111111111111110000111110000
D10.2: 00001111000011110000111100001111100001111
D10.2: 00001111000011110000111100001111100001111
D27.3: 00000000111100000000111111111111100000000

The pattern determining section 210 monitors the squelch signal SQO outputted from the signal detecting section 340 and starts a pattern determination when the squelch signal SQO shows a signal reception (Step S206). In this example, the fact that the squelch signal SQO shows the signal reception means that the ALIGN primitive for the speed negotiation has been received from the device unit. Therefore, the pattern matching of the ALIGN primitive is started.

When the pattern determination is started (Step S206: Yes), the pattern determining section 210 turns on the period counter start signal CST and outputs it to the periodicity determining section 220 (Step S212). The periodicity determining section 220 is in a waiting state until the period counter start signal CST is in an on state (Step S302 in FIG. 4B). When the period counter start signal CST is in the on state, the periodicity determining section 220 starts the period counter to determine the period of the extracted bit pattern (Step S304). That is, the period counter counts the number of bits for the period which matches to the detected data pattern.

The pattern determining section 210 receives the serial data signal SDT showing the ALIGN primitive as data transmitted from the device unit, and samples it based on the reception recovery clock signal RCLK (Step S214 in FIG. 4A). The pattern determining section 210 monitors the squelch signal SQO outputted from the signal detecting section 340, and determines that the signal reception is in a continuation state, based on the squelch signal SQO (Step S216).

Here, when the squelch signal SQO does not show the signal reception (step S216: No), the pattern determination is not carried out. In this case, the periodicity determination reset signal CRS is turned on and the period counter start signal CST is turned off (Step S248). Then, the control flow returns to the step S206 to wait until the squelch signal SQO shows the signal reception.

When the squelch signal SQO shows the signal reception (Step S216: Yes), the pattern determining section 210 monitors the pattern determination reset signal PRS supplied from the periodicity determining section 220 (Step S218). When the pattern determination reset signal PRS is in the off state (Step S218: No), an extracted data pattern obtained through sampling is compared with the detection data patterns. When the pattern determination reset signal PRS is in the on state (Step S218: On), the pattern determining section 210 resets the retained generation difference of the pattern detection signal PDT (Step S242), and turns off the pattern determination effective signal PEN and turns off the periodicity determination reset signal CRS (Step S246). Then, The control flow returns to the step S216.

As a result of the comparison, when the sampled data pattern matches the detection data pattern of the 2-generation difference as 160-bit bit pattern obtained by stretching the original pattern $2^2$ times (the device unit is of a first generation in this example) (Step S222: Yes), the pattern determining section 210 sets "2" for the pattern detection signal PDT to show "the 2-generation difference" (Step S232). The pattern determining section 210 determines whether or not the current detection generation difference is same as the last detection generation difference (Step S237). If being the same (step S237: Yes), the pattern determining section 210 turns on the pattern determination effective signal PEN, and notifies it to the periodicity determining section 220 (Step S238).

Then, the pattern determining section 210 confirms the communication establishment signal RDY, to determine whether or not the speed negotiation completed (Step S252). If the communication establishment signal RDY is in the active state (Step S252: Yes), the pattern detection is completed. If the communication establishment signal RDY is in the inactive state, the control flow returns to the step S216 to continue the pattern determination.

Also, when the current detection generation difference is different from the last detection generation difference (Step S237: No), the pattern determining section 210 turns on the periodicity determination reset signal CRS and outputs it to the periodicity determining section 220 (Step S244). Also, the pattern determining section 210 turns off the pattern determination effective signal PEN and turns off the periodicity determination reset signal CRS (Step S246). Then, the control flow returns to the step S216.

As a result of the comparison, when the extracted data pattern matches the detection data pattern of the 1-generation difference (a second generation in this example) as 80-bit bit pattern obtained by stretching the original pattern $2^1$ times (Step S224: Yes), the pattern determining section 210 sets "1" for the pattern detection signal PDT to show "the 1-generation difference" (Step S234). The pattern determining section 210 determines whether or not the current detection generation difference is same as the last detection generation difference (Step S237). If being the same (step S237: Yes), the pattern determining section 210 turns on the pattern determination effective signal PEN and notifies it to the periodicity determining section 220 (Step S238). The pattern determining section 210 confirms the communication establishment signal RDY to determine whether or not the speed negotiation completed (Step S252). If the communication establishment signal RDY is in the on state (Step S252: Yes), the pattern determination is ended. If the communication establishment signal RDY is in the inactive state, the control flow returns to the step S216 to continue the pattern determination.

Also, when the current detection generation difference is different from the last detection generation difference (Step S237: No), the pattern determining section 210 turns on the periodicity determination reset signal CRS and outputs it to the periodicity determining section 220 (Step S244), and turns off the pattern determination effective signal PEN and turns off the periodicity determination reset signal CRS (Step S246). Then, the control flow returns to the step S216.

As a result of the comparison, when the extracted data pattern matches the detection data pattern as the 40-bit bit pattern of the original pattern of the same generation (a third generation in this example) (Step S226: Yes), the pattern determining section 210 sets "0" for the pattern detection signal PDT to show "the same generation" (Step S236). The pattern determining section 210 determines whether or not the current detection generation difference is same as the last detection generation difference (Step S237). If being the same (step S237: Yes), the pattern determining section 210 turns on the pattern determination effective signal PEN and notifies it to the periodicity determining section 220 (Step S238). Also, the pattern determining section 210 confirms the communication establishment signal RDY to determine whether or not the speed negotiation completed (Step S252). If the communication establishment signal RDY is in the on state (Step S252: Yes), the pattern determination is ended.

If the communication establishment signal RDY is in the off state, the control state returns to the step S216 to continue the pattern determination.

Also, when the current detection generation difference is different from the last detection generation difference (Step S237: No), the pattern determining section 210 turns on the periodicity determination reset signal CRS and outputs it to the periodicity determining section 220 (Step S244). Also, the pattern determining section 210 turns off the pattern determination effective signal PEN and turns off the periodicity determination reset signal CRS (Step S246). Then, the control flow returns to the step S216.

Here, an example in which the detection data patterns up to the 2-generation difference are prepared has been described. However, when the detection data patterns up to the n-generation difference are prepared, the extracted data pattern is compared with the detection data patterns from the re-generation difference to the same generation in the same way.

If the extracted data pattern does not match to any of the detection data patterns (Step S226: No), the pattern determining section 210 turns off the pattern determination effective signal PEN and turns off the periodicity determination reset signal CRS (Step S246). Then, the control flow returns to the step S216 to repeat the above operation.

Also, the control flow returns to the step S106 when receiving COMWAKE even in any step.

When the periodicity determination reset signal CRS is in the off state and the pattern determination effective signal PEN is in the on state, the periodicity determining section 220 determines whether or not the count value of the period counter shows $40 \times 2^n$ (Step S310). When the period counter start signal CST outputted from the pattern determining section 210 is in the on state (step S302: on in FIG. 4B), the periodicity determining section 220 starts the period counter (Step S304), and when being in the off state, the control flow returns to the step S302 to wait until the period counter start signal CST is in the on state (step S302: off).

After the period counter is started, when the periodicity determination reset signal CRS is in the off state (step S306: off), the periodicity determining section 220 determines whether or not the pattern determination effective signal PEN is in the on state (Step S308). When the periodicity determination reset signal CRS is in the on state (Step S306: On), the periodicity determining section 220 resets the period counter and the continuation detection counter (Step S322), and turns off the pattern determination reset signal PRS (Step S326). Then, when the period counter start signal CST is in the on state (step S342: on), the control flow returns to the step S306, and when the period counter start signal CST is in the off state (step S342: off), the control flow returns to the step S302 to wait until the period counter start signal CST is turned on.

When the periodicity determination reset signal CRS is the off state at the step S306 (Step S306: Off), the periodicity determining section 220 determines the count value of the period counter (Step S310) if the pattern determination effective signal PEN is in the on state (step S308: on). When the pattern determination effective signal PEN is in the off state (step S308: off), the control flow returns to the step S306 so as to confirm the state of the periodicity determination reset signal CRS.

When the count value of the period counter does not show $40 \times 2^n$ (Step S310: $\cdot 40 \times 2^n$), the periodicity determining section 220 determines that the detected period is defective, and turns on the pattern determination reset signal PRS to notify the non-matching to the pattern determining section 210 (Step S324). Also, the periodicity determining section 220 resets the period counter and the continuation detection counter (Step S322).

When receiving the pattern determination reset signal PRS in the on state, the pattern determining section 210 resets the retained generation difference (Step S242). Also, the pattern determining section 210 turns off the periodicity determination reset signal CRS and the pattern determination effective signal PEN (Step S246), and control flow returns to the step S216.

The periodicity determining section 220 turns off the pattern determination reset signal PRS (Step S326), and confirms the period counter start signal CST (Step S342). If being remained in the on state (step S342: on), the control flow returns to the step S306. If the period counter start signal CST in the off state (step S342: off), the control flow returns to the step S302, to wait until the period counter start signal CST is turned on.

That is, the sampling of the ALIGN primitive transmitted from the device unit is carried out again. Therefore, even if the ALIGN primitive is erroneously sampled, the speed negotiation can be carried out correctly without an error, by confirming that the extracted data pattern matching to the detection data pattern every 40×2$^n$ (n=0, 1, . . . ) is received, and 40×2$^n$ is the period of the bit pattern of the ALIGN primitive.

When the count value of the period counter is 40×2$^n$ (Step S310: =40×2$^n$), the periodicity determining section 220 determines that the ALIGN primitive transmitted from the device unit could be sampled based on the reception recovery clock signal RCLK, and resets the period counter (Step S312). In this example, because the host unit operates with the speed in the third generation and the device unit operate with the speed in the first generation, the period counter counts 40×2$^2$, i.e. 160 for the 2-generation difference and then is reset. Also, the periodicity determining section 220 counts up the continuation detection counter by one (Step S314).

The periodicity determining section 220 determines whether or not the count value of the continuation detection counter reaches the predetermined number m (Step S332). That is, the control flow returns to the step S306 to repeat the above processing until the bit pattern of the ALIGN primitive is continuously detected m times (Step S332: <m). When the count value of the continuation detection counter is equal to or more than m (Step S332: ·m), the periodicity determining section 220 determines that the ALIGN primitive from the device unit could be continuously detected in a predetermined period m times or more. Therefore, the periodicity determining section 220 sets n ("2" in this example) in the generation difference determination signal GNG to show the generation difference set to the pattern detection signal PDT. Then, the periodicity determining section 220 turns on the speed determination effective signal SEN and notifies to the transmission rate setting section 250 that the generation difference determination processing completed (Step S334).

After setting the maximum speed which it is possible to set, at step S402, the transmission rate setting section 250 waits until the speed determination effective signal SEN is in the on state (Step S404). When the speed determination effective signal SEN is in the on state (Step S404: on), the transmission rate setting section 250 determines an appropriate transmission speed based on the value set in the generation difference determination signal GNG and a value set in the speed set signal SPS which is outputted from the LINK layer. The transmission rate setting section 250 sets the determined transmission speed to the speed mode setting signal SPDS and notifies to the control section 310 (Step S406). In this example, because "3" is set to the speed set signal SPS and "2" is set to the generation difference determination signal GNG, "1" is set to the speed mode setting signal SPDS. That is, 1.5 Gbps which is the transmission speed in the first generation is set as the transmission speed as the result of the speed negotiation with the device unit.

In this way, the data pattern transmitted from the device unit at the time of the speed negotiation is sampled with the reception clock signal with the maximum speed of the host unit, and is received as the bit pattern stretched 2$^n$ times (n=0, 1, 2, 3, . . . ) according to the generation difference n. By determining the generation difference between the host unit and the device unit based on the bit pattern, the transmission speed of the ALIGN primitive transmitted from the device unit can be determined through once speed negotiation. Therefore, according to the present invention, the time required for the connection establishment can be shortened. Also, because the signal is sampled with the reception clock signal with the maximum speed which is supported by the receiving section, it is not necessary to have a faster clock signal.

Second Embodiment

In the first embodiment, the whole bit pattern of the ALIGN primitive of the detection data pattern is an object for comparison. However, in the second embodiment, the generation difference is determined by using the bit pattern of a characteristic portion of the 40-bit ALIGN primitive as the detection bit pattern. Therefore, because the device configuration is the same as the first embodiment, the explanation thereof is omitted. Only the procedure which is different from that of the first embodiment will be described.

The second embodiment is different from the first embodiment in the setting of the detection data pattern. That is, at S202 step, it is supposed that the set detection data pattern is a bit pattern of the whole or part of K28.5 code as the characteristic portion of the ALIGN primitive.

It is supposed that the bit pattern showing K28.5 code is shown as "0011111010" and attention is paid to 5 continuing bits of "1" as the characteristic portion of K28.5 code. The bit pattern of the 5 continuing bits of "1" is the longest continuation portion of "1" in the ALIGN primitive, and is only one portion of the 40-bit bit pattern of the ALIGN primitive. Attention is paid to the "0111110" pattern obtained by adding one bit on each of the front side and back side of the 5 continuing bits, to determine the 5 continuing bits surely. By confirming emergence once every 40×2$^n$ bits, the period can be determined.

Thus, the detection data pattern is set as a bit string of (5×2$^n$+2) bits obtained by adding "0" to each of the front and back sides of the continuing 5×2$^n$ bits (n is the generation difference) of "1" such as Original pattern (no generation difference)/7 bits: 0111110
1-generation difference pattern/12 bits: 011111111110
2-generation difference pattern/22 bits: 0111111111111111111110

The pattern determining section 210 determines the reception bit pattern of the ALIGN primitive based on the set detection data pattern (Steps S222 to S236). When the above pattern is detected, whether or not the current detection generation difference is same as the last detection generation difference is determined (Step S237). If being the same generation difference (step S237: Yes), it is notified to the periodicity determining section 220 (Step S238). The periodicity determining section 220 confirms that the count value of the period counter is 40×2$^n$ (n=0, 1, . . . ) and determines that the pattern is a part of the ALIGN primitive (Step S310). It is confirmed that the determination continues a predetermined number of times (m times) based on the count value of the continuation detection counter (Step S332), and the periodicity determining section 220 determines the transmission speed (Step S334).

In this way, the speed negotiation can be correctly carried out through a determination of the period of the matching to the detection data pattern by the period counter and the number of times of the continuous determination by the continuation detection counter.

The ALIGN primitive has additional characteristic bit patterns. For example,
(1) A pattern of 5 continuing bits of "0" in the inversion pattern of K28.5 code and "1" added on the front side and the back side of the 5 continuing bits Two bit patterns used according to the value of running disparity (RD) are defined in K28.5 code. The above-mentioned K28.5 is K28.5RD−: 0011111010 and K28.5 which is an inverted pattern is K28.5RD+: 1100000101. 5 continuing bits of "0" in K28.5RD+pattern is also used. The pattern of "1000001" in which "1" is added as the front and back bits to determine the 5 continuing bits surely is a characteristic pattern.

(2) The whole K28.5 code

As mentioned above, in K28.5 code, because 2 patterns are defined, the following two 10-bit patterns are characteristic patterns:

K28.5RD−: 0011111010
K28.5RD+: 1100000101

(3) The whole D27.3 code

Two bit patterns used according to the value of running disparity (RD) are defined in D27.3 code. Therefore, the following two 10-bit patterns are characteristic patterns:

D27.3RD+: 0010011100
D27.3RD−: 1101100011

(4) D10.2 code and the head 2 bits of the subsequent D27.3 code

D10.2 code emerges twice in the ALIGN primitive, but when the head 2 bits of the D27.3 code is connected, the pattern emerges only once. D10.2 code is "0101010101" and as mentioned above, because 2 patterns are defined for D27.3 code, the following two 12-bit patterns are characteristic patterns.

(D10.2)+(2 bits of D27.3RD−): 010101010100
(D10.2)+(2 bits of D27.3RD+): 010101010111

(5) A bit pattern of "100111000011111" or "011000111100000" which is contained in D27.3 code and K28.5 code.

There is a bit portion in which bits of "0" or "1" alternately continue by 1 bit, 2 bits, 3 bits, 4 bits, 5 bits in the bit pattern from D27.3 code to K28.5 code. When arranging two codes as follows, $$D27.3RD+ \quad K28.5RD-:$$
$$0010011100 \quad 0011111010$$
$$\ldots \quad \ldots$$

or, the inversion pattern $$D27.3RD- \quad K28.5RD+$$
$$1101100011 \quad 1100000101$$
$$\ldots \quad \ldots \ .$$

Thus, two 15-bit patterns are characteristic patterns.

In this way, all the characteristic patterns can be used as the detection data patterns without mis-interpretation and mis-detection of the generation difference. The speed negotiation can be carried out in the same way even if these detection data patterns are used. By adopting a short detection data pattern in this way, a comparator of the bit pattern can be simplified.

As mentioned above, because the reception data signal is sampled by using the reception clock signal with the maximum speed in the receiving section of the serial communication apparatus, the receiving section can be designed without improvement for speeding up and the load of the circuit design can be reduced. Also, it needs only to set the generation difference from n to n+1 in case of speed-up due to update of the standard, and the same logic can be applied.

Thus, the embodiments have been described. Here, the above embodiments can be combined as far as there is no contradiction. Also, the present invention is not limited to the embodiments and the configuration and operation of the present invention may be modified in the scope of the present invention by a skilled person in the art.

What is claimed is:

1. A serial communication circuit for a host unit, comprising:
    a data extracting section configured to
    i) receive a) an input data signal comprising a clock signal and reception data corresponding to a characteristic pattern, the input data signal transmitted at a transmission speed from a connected device unit, and b) a reference reception clock signal at a maximum speed,
    ii) based on the maximum speed of the reference reception clock signal, extract the reception data and a reception recovery clock signal from the input data signal, and
    iii) output an output data signal and the reception recovery clock signal;
    a pattern determining section configured to
    i) receive the reception recovery clock signal from the data extracting section and to receive the input data signal, and
    ii) based on a speed of the reception recovery clock signal, compare a reception bit pattern of the reception data with each of a plurality of detection bit patterns for said characteristic pattern, and provide a notice of pattern matching when each bit of said reception bit pattern matches corresponding bits of one of said plurality of detection bit patterns;
    a periodicity determining section operatively connected to an output of the pattern determining section and configured to determine a period when said reception bit pattern, bit by bit, matches said detection bit pattern, based on the notice from said pattern determining section, detect that said detection bit pattern emerges continuously in a stream of the reception data every said determined period, and determine a generation difference between the transmission speed and a reception speed based on said detection bit pattern; and
    a transmission rate setting section configured to determine said transmission speed of the connected device which transmits the reception data, based on said generation difference and said maximum speed.

2. The serial communication circuit according to claim 1, wherein said plurality of detection bit patterns are patterns generated by linking each of bits of said characteristic pattern of original data indicating a bit pattern transmitted in speed negotiation for $2^n$, and n indicates each of integers from "0" to a maximum generation difference.

3. The serial communication circuit according to claim 2, wherein said periodicity determining section determines said generation difference when detecting that said detection bit pattern emerges periodically and continuously more than a predetermined number of times.

4. The serial communication circuit according to claim 2, wherein said characteristic pattern is a 40-bit bit pattern of ALIGN data.

5. The serial communication circuit according to claim 2, wherein said characteristic pattern is a bit pattern matching to a part of a 40-bit bit pattern of ALIGN data and not matching to the other part thereof.

6. The serial communication circuit according to claim 5, wherein said characteristic pattern is a bit pattern indicating K28.5 code or D27.3 code of the ALIGN data.

7. The serial communication circuit according to claim 5, wherein said characteristic pattern is a bit pattern obtained by connecting a pattern of D10.2 code of the ALIGN data pattern and a 2-bit head pattern of D27.3 code, or a 15-bit pattern obtained by continuously connecting a bit alternately showing "1" and "0" for 1 bit, 2 bits, 3 bits, 4 bits, and 5 bits.

8. The serial communication circuit according to claim 5, wherein said characteristic pattern is a bit pattern obtained by connecting a longest continuing pattern of "1" or "0" and one bit on a front side and back side of the longest continuing pattern, of the 40-bit bit pattern of the ALIGN data.

9. A serial communication control method for a host unit, the method comprising:
receiving an input data signal comprising a clock signal and reception data corresponding to a characteristic pattern, the input data signal being transmitted at a transmission speed from a connected device;
based on a reference reception clock signal at a maximum speed, extracting the reception data and a reception recovery clock signal from the input data signal;
based on a speed of the reception recovery clock signal extracted from the input data signal, comparing a reception bit pattern of the reception data with each of a plurality of detection bit patterns for said characteristic pattern to provide a notice of pattern matching when each bit of said reception bit pattern matches corresponding bits of one of said plurality of detection bit patterns;
based on said notice, determining a period when said reception bit pattern, bit by bit, matches said detection bit pattern;
detecting that said detection bit pattern emerges continuously in a stream of the reception data every said determined period;
determining a generation difference between the transmission speed and a reception speed based on said detection bit pattern; and
determining said transmission speed of said connected device which transmits the reception data based on said generation difference and said maximum speed.

10. The serial communication control method according to claim 9, wherein said plurality of detection bit patterns are patterns generated by linking each of bits of said characteristic pattern of original data indicating a bit pattern transmitted in speed negotiation for 2", wherein n indicates each of integers from "0" to a maximum generation difference.

11. The serial communication control method according to claim 10, wherein said determining a generation difference comprises:
determining said generation difference when detecting that said detection bit pattern emerges periodically and continuously more than a predetermined number of times.

12. The serial communication control method according to claim 10, wherein said characteristic pattern is a bit pattern matching to a part of a 40-bit bit pattern of ALIGN data and not matching to the other part thereof.

13. The serial communication control method according to claim 10, wherein said characteristic pattern is a bit pattern matching to a part of a 40-bit bit pattern of ALIGN data.

14. The serial communication control method according to claim 13, wherein said characteristic pattern is a bit pattern indicating K28.5 code or D27.3 code of the ALIGN data.

15. The serial communication control method according to claim 13, wherein said characteristic pattern is a bit pattern obtained by connecting a pattern of D10.2 code of the ALIGN data pattern and a 2-bit head pattern of D27.3 code, or a 15-bit pattern obtained by continuously connecting a bit alternately showing "1" and "0" for 1 bit, 2 bits, 3 bits, 4 bits, and 5 bits.

16. The serial communication control method according to claim 13, wherein said characteristic pattern is a bit pattern obtained by connecting a longest continuing pattern of "1" or "0" and one bit on a front side and back side of the longest continuing pattern, of the 40-bit bit pattern of the ALIGN data.

17. The serial communication control circuit according to claim 1, wherein,
the transmission speed is 1.5 Gbps in case of a first generation (Gen1), the transmission speed is 3.0 Gbps in case of a second generation (Gen2), and the transmission speed is 6.0 Gbps in case of a third generation (Gen3),
said generation difference between said first generation and said second generation is two (2), and
said generation difference between said first generation and said second generation is four (4).

18. The serial communication control method according to claim 9, wherein,
the transmission speed is 1.5 Gbps in case of a first generation (Gen1), the transmission speed is 3.0 Gbps in case of a second generation (Gen2), and the transmission speed is 6.0 Gbps in case of a third generation (Gen3),
said generation difference between said first generation and said second generation is two (2), and
said generation difference between said first generation and said second generation is four (4).

19. The serial communication control circuit according to claim 1, wherein the reception speed of the host unit is set to the determined transmission speed of the connected device after determining said generation difference.

20. The serial communication control method according to claim 9, comprising a further step of setting the reception speed of the host unit to the determined transmission speed of the connected device, after having determined said generation difference.

* * * * *